(12) United States Patent
Hintz et al.

(10) Patent No.: US 8,564,247 B2
(45) Date of Patent: Oct. 22, 2013

(54) CELL MANAGEMENT SYSTEM

(71) Applicant: Indy Power Systems LLC, Carmel, IN (US)

(72) Inventors: Andrew S. Hintz, Avon, IN (US); Quentin Wayne Kramer, Albuquerque, NM (US); Robert L. Gaylen, Noblesville, IN (US)

(73) Assignee: Indy Power Systems LLC, Carmel, IN (US)

( * ) Notice: Subject to any disclaimer, the term of this patent is extended or adjusted under 35 U.S.C. 154(b) by 0 days.

(21) Appl. No.: 13/646,953

(22) Filed: Oct. 8, 2012

(65) Prior Publication Data

US 2013/0026993 A1    Jan. 31, 2013

Related U.S. Application Data

(62) Division of application No. 12/687,499, filed on Jan. 14, 2010, now Pat. No. 8,288,992.

(60) Provisional application No. 61/144,596, filed on Jan. 14, 2009.

(51) Int. Cl.
*H02J 7/00* (2006.01)
*H02J 7/16* (2006.01)

(52) U.S. Cl.
USPC ........... 320/119; 320/117; 320/121; 320/122; 320/134

(58) Field of Classification Search
USPC ......... 320/116, 117, 118, 119, 121, 122, 124, 320/125, 126, 134, 135, 136, 137, 148, 149
See application file for complete search history.

(56) References Cited

U.S. PATENT DOCUMENTS

| | | | | |
|---|---|---|---|---|
| 5,773,959 | A * | 6/1998 | Merritt et al. | 320/120 |
| 5,982,143 | A * | 11/1999 | Stuart | 320/119 |
| 6,430,692 | B1 * | 8/2002 | Kimble et al. | 713/300 |
| 6,452,362 | B1 * | 9/2002 | Choo | 320/116 |
| 6,462,511 | B1 * | 10/2002 | Kwok | 320/119 |
| 7,557,538 | B2 * | 7/2009 | Yau et al. | 320/116 |
| 7,880,433 | B2 * | 2/2011 | Oh et al. | 320/118 |
| 2005/0140335 | A1 * | 6/2005 | Lee et al. | 320/118 |
| 2008/0180061 | A1 * | 7/2008 | Koski et al. | 320/117 |
| 2009/0067200 | A1 * | 3/2009 | Bolz et al. | 363/17 |
| 2010/0244781 | A1 * | 9/2010 | Kramer et al. | 320/162 |
| 2010/0295509 | A1 * | 11/2010 | Moussaoui et al. | 320/118 |

\* cited by examiner

*Primary Examiner* — Edward Tso
*Assistant Examiner* — Alexis Boateng
(74) *Attorney, Agent, or Firm* — Anthony P. Filomena; Taftstettinius & Houister, LLP

(57) ABSTRACT

A cell management system and method for balancing energy across a plurality of cells coupled to a circuit bus. The system can include a transformer, two transformer switches, and for each cell, a first switch pair allowing transfer of energy between the transformer and the cell, and a second switch pair allowing removal or inclusion of the cell in the serial connection of cells. The system can include an energy storage device, a switch pair allowing transfer of energy between the transformer and the storage device, and for each cell, a third switch pair allowing transfer of energy between the storage device and the cell. The system can include cell, bus and storage device sensors and state estimators. The system can include a controller that controls the transformer switches, cell switches, and storage device switches based on the sensor readings and states.

5 Claims, 12 Drawing Sheets

FIG. 10

Switch Positions Synchronous DC-DC Converter internal to CMS

| Step1 | | | | | | | Step2 | | | | | | |
|---|---|---|---|---|---|---|---|---|---|---|---|---|---|
| Q1 | Q2 | L1 | | Bus | | Cell(s) | Q1 | Q2 | L1 | | Bus | | Cell(s) |
| Close | Open | Charge | | N/A | | Charge | Open | Open | Discharge | | N/A | | Charge |
| Open | Close | Charge | | Charge | | N/A | Open | Open | Discharge | | Charge | | N/A |

| Step3 | | | | | | | Step4 | | | | | | | Repeat |
|---|---|---|---|---|---|---|---|---|---|---|---|---|---|---|
| Q1 | Q2 | L1 | | Bus | | Cell(s) | Q1 | Q2 | L1 | | Bus | | Cell(s) | |
| Open | Close | Discharge | | N/A | | Discharge | Open | Open | Discharge | | N/A | | Discharge | Repeat steps 1, 2, 3 & 4 |
| Close | Open | Discharge | | Discharge | | N/A | Open | Open | Discharge | | Discharge | | N/A | Repeat steps 1, 2, 3 & 4 |

Protected Circuit: With Diodes

Sequence #
1. Move Energy from Bus to Cell(s)
2. Move Energy from Cell(s) to Bus

FIG. 11

Switch Positions Non-Synchronous DC-DC Converter internal to CMS

| Step1 | | | | | Step2 | | | | | Repeat |
|---|---|---|---|---|---|---|---|---|---|---|
| Q1 | Q2 | L1 | Bus | Cell(s) | Q1 | Q2 | L1 | Bus | Cell(s) | |
| Close | Open | Charge | Discharge | N/A | Open | Open | Discharge | N/A | Charge | Repeat steps 1 & 2 |
| Open | Close | Charge | N/A | Discharge | Open | Open | Discharge | Charge | N/A | Repeat steps 1 & 2 |

Protected Circuit: With Diodes

Sequence #
1. Move Energy from Bus to Cell(s)
2. Move Energy from Cell(s) to Bus

Bus to Single Cell/Module

| Switch Number: | 101 | 102 | 103 | 104 | 201 | 202 | 203 | 204 | 301 | 302 | 303 | 304 | 401 | 402 | 403 | 404 |
|---|---|---|---|---|---|---|---|---|---|---|---|---|---|---|---|---|
| Latch Cell 1 | C | O | C | O | O | O | C | O | O | O | C | O | O | O | C | O |
| Latch Cell 2 | O | C | C | O | C | O | C | O | O | O | C | O | O | O | C | O |
| Latch Cell 3 | O | C | C | O | O | O | C | O | C | O | C | O | O | O | C | O |
| Latch Cell 4 | O | C | C | O | O | O | C | O | O | O | C | O | C | O | C | O |

O = Open, C = Closed

FIG. 12

Bus to Two Cells/Modules

| Switch Number: | 101 | 102 | 103 | 104 | 201 | 202 | 203 | 204 | 301 | 302 | 303 | 304 | 401 | 402 | 403 | 404 |
|---|---|---|---|---|---|---|---|---|---|---|---|---|---|---|---|---|
| Latch Cell 1 & 2 | C | O | C | O | C | O | C | O | O | O | C | O | O | O | C | O |
| Latch Cell 2 & 3 | O | C | C | O | C | O | C | O | C | O | C | O | O | O | C | O |
| Latch Cell 3 & 4 | O | C | C | O | O | O | C | O | C | O | C | O | C | O | C | O |

O = Open, C = Closed

FIG. 13

Bus to Three Cells/Modules

| Switch Number: | 101 | 102 | 103 | 104 | 201 | 202 | 203 | 204 | 301 | 302 | 303 | 304 | 401 | 402 | 403 | 404 |
|---|---|---|---|---|---|---|---|---|---|---|---|---|---|---|---|---|
| Latch Cell 1, 2 & 3 | C | O | C | O | C | O | C | O | C | O | C | O | O | O | C | O |
| Latch Cell 2, 3 & 4 | O | C | C | O | C | O | C | O | C | O | C | O | C | O | C | O |

O = Open, C = Closed

FIG. 14

Bus to Four Cells/Modules

| Switch Number: | 101 | 102 | 103 | 104 | 201 | 202 | 203 | 204 | 301 | 302 | 303 | 304 | 401 | 402 | 403 | 404 |
|---|---|---|---|---|---|---|---|---|---|---|---|---|---|---|---|---|
| Latch Cell 1, 2, 3 & 4 | C | O | C | O | C | O | C | O | C | O | C | O | C | O | C | O |

O = Open, C = Closed

FIG. 15

Isolate Single Cell/Module

| Switch Number: | 101 | 102 | 103 | 104 | 201 | 202 | 203 | 204 | 301 | 302 | 303 | 304 | 401 | 402 | 403 | 404 |
|---|---|---|---|---|---|---|---|---|---|---|---|---|---|---|---|---|
| IsolateLatch Cell 1 | O | O | O | O | C | O | C | O | C | O | C | O | C | O | C | O |
| IsolateLatch Cell 2 | C | O | C | O | O | O | O | O | C | O | C | O | C | O | C | O |
| IsolateLatch Cell 3 | C | O | C | O | C | O | C | O | O | O | O | O | C | O | C | O |
| IsolateLatch Cell 4 | C | O | C | O | C | O | C | O | C | O | C | O | O | O | O | O |

O = Open, C = Closed

FIG. 16

CELL MANAGEMENT SYSTEM

This application is a division of U.S. patent application Ser. No. 12/687,499, filed Jan. 14, 2010 entitled "Cell Management System," issued as U.S. Pat. No. 8,288,992, which claims priority to U.S. Provisional Patent Application Ser. No. 61/144,596, filed Jan. 14, 2009 entitled "Cell Management System," the disclosures of which are both expressly incorporated herein by reference.

BACKGROUND AND SUMMARY

The present invention generally relates to an apparatus and methodology for allowing a single battery cell or module to be charged or discharged in parallel within a series circuit, so that the cells or modules can be balanced either during charging, discharge, or at rest (i.e. not being charged or discharged via an outside source.).

There is a growing need for cell balancing because there are inconsistencies in the construction and materials of every cell that while small, can have a material impact on the cell's charge and discharge characteristics. This non-uniformity tends to magnify differences in a cell's State of Charge (SOC) over time when compared to other cells similarly charged and discharged. While balancing cell SOC in a battery can extend the life of the battery, it can also reduce the chance that a cell may experience a thermal event that can range from gassing to combustion. While most battery cells (and hence the battery) display some sort of degradation in performance if over- or under-charged, the Li-ion battery has a history of causing fires if overcharged and their cost makes damaging them in a low SOC an event that is to be avoided.

Traditional battery and battery cell management systems remove a cell from a battery or remove a battery from a pack if and when its SOC crosses an upper or lower threshold. The problem with this strategy is that on occasion, the removal of a cell during discharge causes the other cells to work harder to discharge the required energy, increasing the chances that another cell will reach its limit, which then increases the chance that another cell will reach its limit and so on. Cascade failure occurs when the battery or battery pack sequentially fails and is removed from the system to the point that the whole system shuts down.

More advanced cell management systems sequentially read individual cell voltage at different points of time to determine its SOC. However, as the load (or charge) on a battery increases, the SOC can change materially and non-linearly in very small amounts of time. Individual readings even over short periods of time can lead to inaccurate measurements and thus less efficient balancing. The present system can be set to monitor and review all cells simultaneously and compute corresponding SOC simultaneously. By simultaneously monitoring cell SOC, more precise measurement can be made, and more precise cell management can be attained.

An additional feature of the present system is the ability to group a number of cells in series (a "module") and to treat the module as an individual cell. This ability can speed the balancing process.

The present system can passively monitor cells and has the ability to latch on to a cell or module when energy movement is required. This can extend battery cell life by powering itself to cycle a cell into the balancing only as required. Other cell balancing systems sequentially latch to each cell in and out of the system to monitor their voltage. As such, the present system can be more energy efficient than existing systems.

For battery manufacturers, vehicle manufacturers, electric grid system manufacturers, the military, and wherever battery electrical power is used, the system disclosed herein can more efficiently manage electrical energy between battery cells, or modules, so that the batteries last longer, remain safer, and are capable of higher performance.

It is expected that as new battery, energy storage, and energy generation technologies evolve; various combinations of existing and future technologies can be balanced using the present system.

A cell management system is disclosed for balancing energy across a plurality of cells coupled to a circuit bus where each cell of the plurality of cells includes a positive terminal and a negative terminal. The cell management system includes a transformer, first and second transformer switches, and for each individual cell: a first cell switch pair and a second cell switch pair. The transformer couples the circuit bus and the plurality of cells. The transformer includes a first inductor coupled to the circuit bus and a second inductor coupled to the plurality of cells. The first transformer switch couples the first inductor and the circuit bus. The second transformer switch couples the second inductor and the plurality of cells. The first cell switch pair of each individual cell allows the transfer of energy between the transformer and the individual cell. The second cell switch pair of each individual cell allows the removal or inclusion of the individual cell in the serial connection of the plurality of cells. The cell management system also includes a connection between the circuit bus and a first cell located at one end of the serial connection of cells, and a connection between the circuit bus and a last cell located at the opposite end of the serial connection of cells.

The cell management system can also include a first diode connected in parallel with the first transformer switch and a second diode connected in parallel with the second transformer switch.

The first cell switch pair for a cell can include a first cell switch coupling the negative terminal of the cell with the second inductor; and a second cell switch coupling the positive terminal of the cell with the second transformer switch. In one embodiment, the second inductor is located between the first cell switch and the second transformer switch, and the second transformer switch is located between the second inductor and the second cell switch.

The second cell switch pair for a cell can include a third cell switch and a fourth cell switch. In one embodiment, if the cell is the first cell, the third cell switch couples the negative terminal of the cell with the circuit bus; otherwise the third cell switch couples the negative terminal of the cell with the positive terminal of the preceding cell in the serial connection of cells. In this embodiment, if the cell is the last cell, the fourth cell switch couples the negative terminal of the cell with the circuit bus; otherwise the fourth cell switch couples the negative terminal of the cell with the negative terminal of the next cell in the serial connection of cells. In this embodiment, the third cell switch couples the fourth cell switch and the negative terminal of the cell, and the third cell switch couples the first cell switch and the negative terminal of the cell.

The second cell switch pair for a cell can include a third cell switch and a fourth cell switch wherein, when the cell is not the last cell, the third cell switch couples the positive terminal of the cell with the negative terminal of the next cell in the serial connection of cells; and when the cell is the last cell, the third cell switch couples the positive terminal of the cell with the circuit bus. In this embodiment, when the cell is not the last cell, the fourth cell switch couples the negative terminal of the cell with the negative terminal of the next cell in the serial connection of cells; and when the cell is the last cell, the fourth cell switch couples the negative terminal of the cell with the circuit bus. In this embodiment, the third cell switch is located between the fourth cell switch and the positive terminal of the cell, and the third cell switch is located between the second cell switch and the positive terminal of the cell.

The cell management system can also include cell sensors, bus sensors, cell state estimators, system state estimators and a controller. The cell sensors can monitor parameter of the cells, for example cell voltage, cell temperature, or cell current. The bus sensor can monitor a parameter of the circuit bus. The cell state estimator can determine a state of each cell using the cell sensors. The system state estimator can determine a state of the circuit bus. The controller can control the first transformer switch, the second transformer switch, the first cell switch pair and the second cell switch pair based on the state of each of the cells and the state of the circuit bus.

The cell management system can include a short-term energy storage device, a storage device switch pair allowing the transfer of energy between the transformer and the short-term energy storage device, and a third cell switch pair for each cell. The third cell switch pair allows the transfer of energy between the short-term energy storage device and the cell. The third cell switch pair can include a fifth cell switch coupling the negative terminal of the cell with the short-term energy storage device, and a sixth cell switch coupling the positive terminal of the cell with the short-term energy storage device, where the short-term energy storage device is located between the fifth cell switch and the sixth cell switch. The storage device switch pair can include a first storage device switch coupling the negative terminal of the storage device with the second inductor and a second storage device switch coupling the positive terminal of the storage device with the second transformer switch, where the second inductor is located between the first storage device switch and the second transformer switch, and the second transformer switch is located between the second inductor and the second storage device switch. The cell management system can also include a storage device state estimator determining a state of the short-term energy storage device, and the controller can control the storage device switch pair based on the state of the cells, the circuit bus, and the short-term energy storage device.

An embodiment of a cell management system for balancing energy across a plurality of cells coupled to a circuit bus is disclosed, where each of the cells includes a positive terminal and a negative terminal. The cell management system includes a first cell switch pair, a second cell switch pair, and a fourth cell switch pair for each cell, a transformer and two transformer switches. The transformer can include a first inductor on a first side of the transformer, and a second inductor on a second side of the transformer. The first cell switch pair for each cell is on the second side of the transformer, and the fourth cell switch pair for each cell is on the first side of the transformer. The first transformer switch is located between the first inductor and the fourth cell switch pair for each cell. The second transformer switch is located between the second inductor and the first cell switch pair for each cell. This embodiment of the cell management system also includes a connection between the circuit bus and a first cell located at one end of the serial connection of cells; and a connection between the circuit bus and a last cell located at the opposite end of the serial connection of cells. The first cell switch pair of a cell allows the transfer of energy between the transformer and the cell, the second cell switch pair of a cell allows the removal or inclusion of the cell in the serial connection of cells, and the fourth cell switch pair of the cell allows the transfer of energy between the transformer and the cell.

The first cell switch pair for a cell can include a first cell switch coupling the negative terminal of the cell with the second inductor, and a second cell switch coupling the positive terminal of the cell with the second transformer switch; the second inductor being between the first cell switch and the second transformer switch, and the second transformer switch being between the second inductor and the second cell switch. The fourth cell switch pair for a cell can include an eighth cell switch coupling the negative terminal of the cell with the first inductor, and a seventh cell switch coupling the positive terminal of the cell with the first transformer switch; the first inductor being between the eighth cell switch and the first transformer switch, and the first transformer switch being between the first inductor and the seventh cell switch.

This embodiment of the cell management system can also include a short-term energy storage device, a storage device switch pair allowing the transfer of energy between the transformer and the short-term energy storage device, and a third cell switch pair for each cell that allows the transfer of energy between the short-term energy storage device and the cell. The cell management system can also include cell sensors, bus sensors, storage device sensors, cell state estimators, a system state estimator, a storage device state estimator and a controller to control the transformer switches, the cell switches, and the storage device switches based on the appropriate sensor readings.

A method is disclosed for controlling a plurality of cells connected to a transformer through a first set of switches to charge and discharge the transformer and connected in series through a second set of switches to provide energy to a system. The method includes determining a state of charge value for each cell; determining a minimum state of charge value for the plurality of cells; determining a minimum state of charge cell having the minimum state of charge value; determining a maximum state of charge value for the plurality of cells; determining a maximum state of charge cell having the maximum state of charge value; calculating a state of charge difference as the difference between the maximum and minimum state of charge values; when the state of charge difference exceeds a state of charge deadband, equalizing the state of charge values of the plurality of cells using the transformer; identifying whether any cells are unhealthy; and bypassing any unhealthy cells.

The step of equalizing the state of charge values of the plurality of cells using the transformer can include determining whether the cells are in a charge mode or a discharge mode. When the cells are in the charge mode, switching at least two switches of the first set of switches to isolate the minimum state of charge cell and to charge the minimum state of charge cell using the transformer. When the cells are in the discharge mode, switching at least two switches of the first set of switches to isolate the maximum state of charge cell and to discharge the maximum state of charge cell using the transformer.

The step of bypassing any unhealthy cell can include determining whether to replace the energy of the unhealthy cell. When it is determined not to replace the energy of the unhealthy cell, switching at least one switch of the second set of switches to remove the unhealthy cell from the serial connection of cells and maintain the serial connection of the remaining cells. When it is determined to replace the energy of the unhealthy cell, switching at least one switch of the second set of switches to remove the unhealthy cell from the serial connection of cells and switching at least one switch of the first set of switches to insert energy from the transformer in place of the unhealthy cell.

A method is disclosed for controlling a plurality of cells connected to a transformer through a first set of switches to charge and discharge the transformer and connected in series through a second set of switches to provide energy to a system. The method includes determining a state of charge value for each healthy cell; determining a minimum state of charge value across all of the healthy cells; determining a maximum state of charge value across all of the healthy cells; computing an average state of charge value for all of the healthy cells; computing a delta minimum state of charge value equal to the difference between the average state of charge value and the minimum state of charge value; computing a delta maximum state of charge value equal to the difference between the maximum state of charge value and the average state of charge value; identifying any overcharged cells; identifying any undercharged cells; determining whether to equalize the state of charge values of the healthy cells; identifying whether any cells are unhealthy; and when an unhealthy cell is identified, bypassing the unhealthy cell.

The step of bypassing the unhealthy cell can include determining whether to replace the energy of the unhealthy cell. When it is determined not to replace the energy of the unhealthy cell, switching at least one switch of the second set of switches to remove the unhealthy cell from the serial connection of cells and maintain the serial connection of the remaining cells. When it is determined to replace the energy of the unhealthy cell, switching at least one switch of the second set of switches to remove the unhealthy cell from the serial connection of cells and switching at least one switch of the first set of switches to insert energy from the transformer in place of the unhealthy cell.

When it is determined to equalize the state of charge values of the healthy cells, the method can include determining whether the delta maximum state of charge value is greater than the delta minimum state of charge value. When the delta maximum state of charge value is greater than the delta minimum state of charge value and any overcharged cells are identified, switching at least two switches of the first set of switches to isolate each of the overcharged cells and to discharge the overcharged cells using the transformer. When the delta maximum state of charge value is not greater than the delta minimum state of charge value and any undercharged cells are identified, switching at least two switches of the first set of switches to isolate each of the undercharged cells and to charge the undercharged cells using the transformer.

When it is determined to equalize the state of charge values of the healthy cells, the method can include the following steps. When both overcharged and undercharged cells are identified, switching at least two switches of the first set of switches to isolate each of the overcharged cells and discharge the overcharged cells using the transformer, and to isolate each of the undercharged cells and charge the undercharged cells using the transformer. When both overcharged and undercharged cells are not identified, determining whether the delta maximum state of charge value is greater than the delta minimum state of charge value; when the delta maximum state of charge value is greater than the delta minimum state of charge value and any overcharged cells are identified, switching at least two switches of the first set of switches to isolate each of the overcharged cells and to discharge the overcharged cells using the transformer; and when the delta maximum state of charge value is not greater than the delta minimum state of charge value and any undercharged cells are identified, switching at least two switches of the first set of switches to isolate each of the undercharged cells and to charge the undercharged cells using the transformer.

BRIEF DESCRIPTION OF THE DRAWINGS

FIG. 10 is a step-by-step process showing synchronous DC-DC converter switch positions;

FIG. 11 is a step-by-step process showing non-Synchronous DC-DC converter switch positions;

FIG. 12 shows switch positions for latching to a single cell/module of the embodiment in FIG. 2;

FIG. 13 shows switch positions for latching to two cells/modules for the embodiment in FIG. 2;

FIG. 14 shows switch positions for latching to three cells/modules for the embodiment in FIG. 2;

FIG. 15 shows switch positions for latching to four cells/modules for the embodiment in FIG. 2; and FIG. 16 shows switch positions for isolating and removing an individual cell/module for the embodiment in FIG. 2.

DESCRIPTION OF EXEMPLARY EMBODIMENTS

The exemplary embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

An example of the value of a cell management system would be in the design of a Lithium-ion (Li-ion) battery. The manufacturing process of Li-ion battery cells leads to variations that correlate to potentially unbalanced cells if unmanaged. Without voltage balancing, the cells in a Li-ion battery will become out of balance, with one or more cells in the series above or below the average cell voltage of the battery. Without a balancing system, as the battery cells are charged and discharged in a series, the difference in voltage grows until such a time that the voltage difference becomes critical and the battery malfunctions. There are low voltage thresholds that, once met, can permanently damage the battery. There are also high thresholds that, once met, can cause the battery to react and overheat, leading to gassing and/or thermal runaway, which can result in fire.

Figure 1:
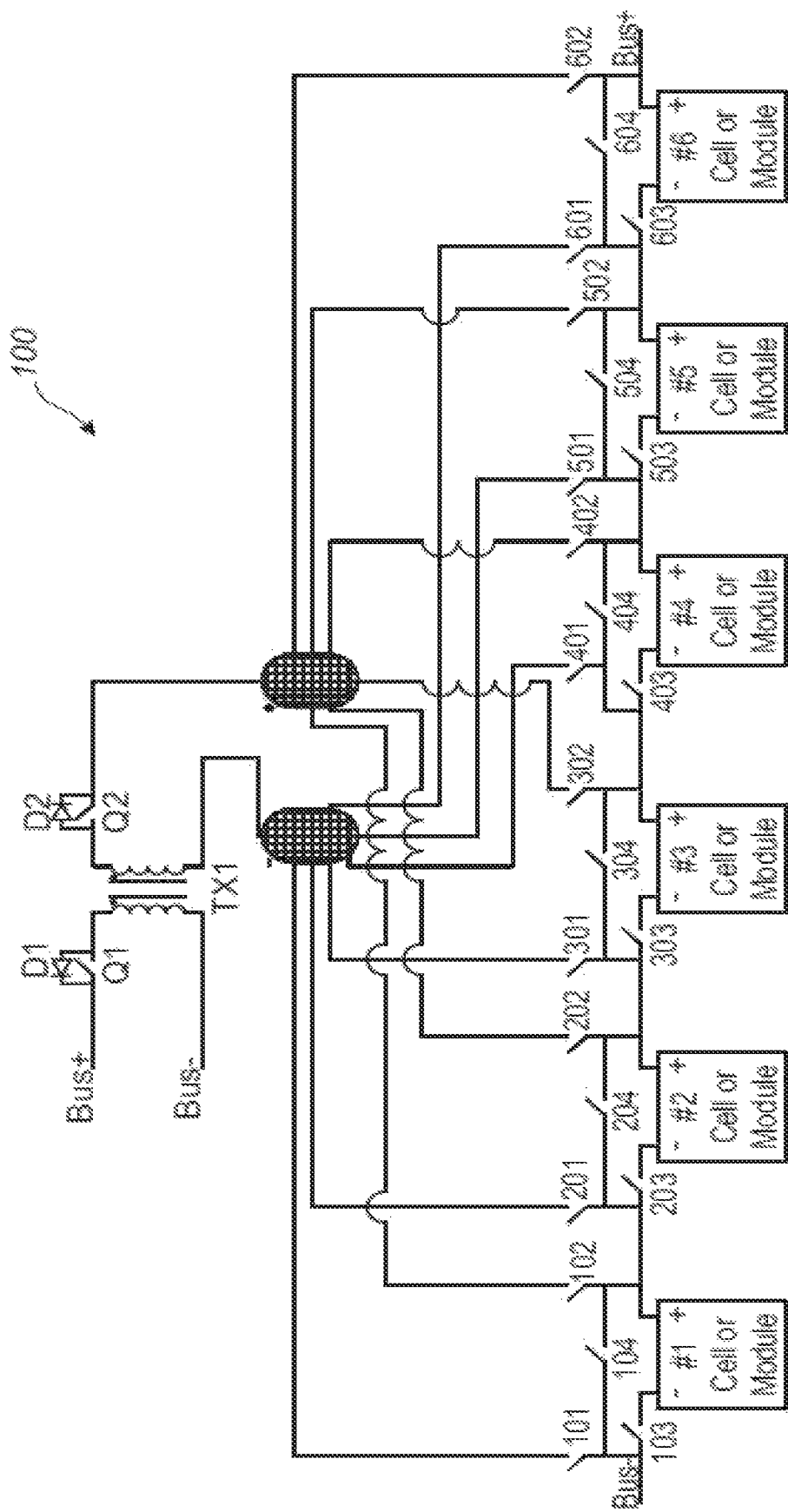
FIG. 1 is a schematic illustrating an embodiment of a cell management system using six battery cells.

FIG. 1 is a schematic illustrating an exemplary cell management system 100 capable of distributing either a load or a source current through a circuit bus. The system 100 includes a bi-directional DC-to-DC converter comprising an energy conversion transformer TX1 and two switches Q1 and Q2. The system 100 includes individual cell switch pairs 101 and 102, 201 and 202, through n01 and n02 where n equals the number of cells connected to the system 100. FIG. 1 illustrates an embodiment which has 6 (six) cells connected to the system 100. The circuit also contains switch pairs 103 and 104, 203 and 204, through n03 and n04. The paired switches, n01 and n02, allow the system 100 to move energy from the bus to an individual cell or from the individual cell to the bus utilizing the two switches Q1 and Q2 as well as a pair of diodes D1 and D2 to move the energy. The diodes D1 and D2 are utilized for safety within the embodiment but are not required for running in synchronous mode. The paired switches, n03 and n04, allow for the removal (or inclusion) of a cell from the series of cells.

Figure 2:
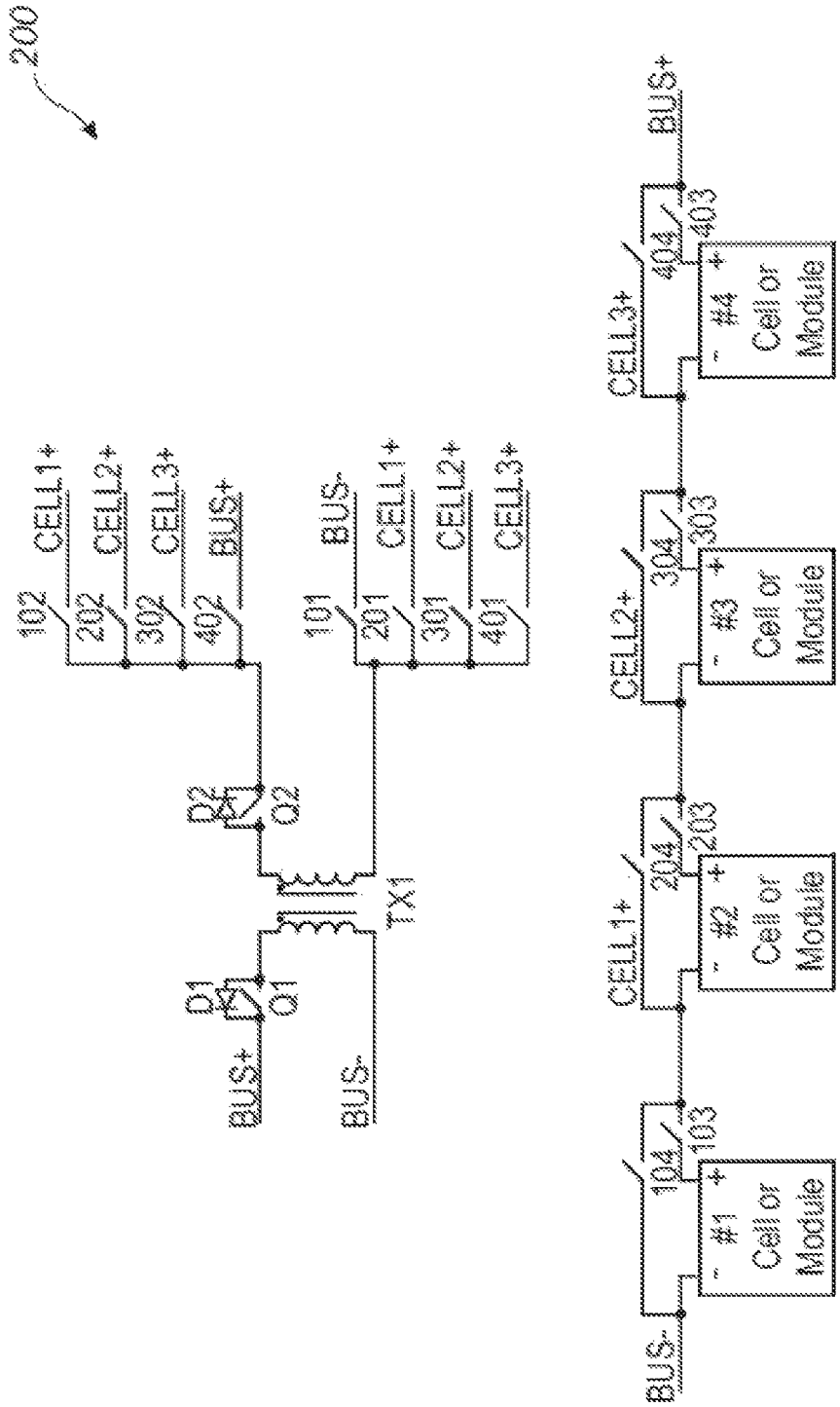
FIG. 2 is a schematic illustrating an alternative embodiment of a cell management system using four battery cells.

FIG. 2 is a schematic illustrating an alternative embodiment of a cell management system 200 capable of distributing either a sink or source current through a bus. The same reference numerals are used for corresponding components illustrated in FIG. 1. The circuit 200 comprises the bi-directional DC-to-DC converter, the switch pairs n01 and n02 to latch to a cell or module, and the switch pairs n03 and n04 to remove or include a cell in the series. The locations of the switch pairs n01 and n02 correspond to the relative positions noted in FIG. 1 in relation to each cell or module. For example, switch pair 101 and 102 correspond to cell or module one, and switch pair 201 and 202 correspond to cell or module two. The system 200 is capable of 'latching on' to individual cells or modules as well as latching on to multiple concurrent cells. For example, energy can be moved from the bus to cells/modules 2 and 3 simultaneously. Note that the switches n03 moved to the positive side of the cell/module compared to FIG. 1. This positioning of the switches n03 allows the system to determine if a cell/module becomes healthy after it has been locked out of the system and then can be reconnected to the system.

Figure 3:
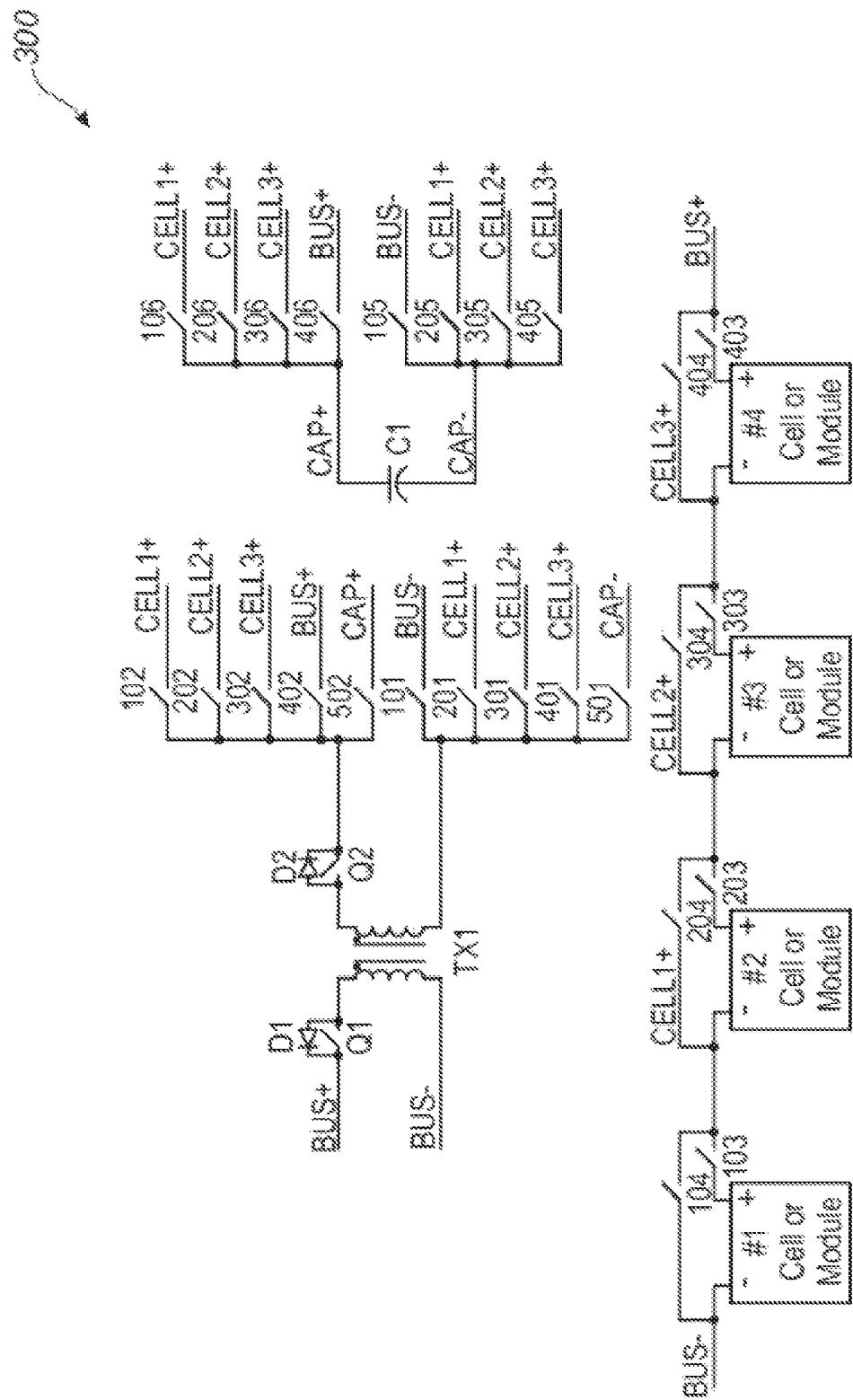
FIG. 3 is a schematic illustrating another embodiment of a cell management system using four battery cells.

FIG. 3 is a schematic illustrating another embodiment 300 of a cell management system capable of distributing either a sink or source current through a bus. The same reference numerals are used for corresponding components illustrated in FIG. 1. The circuit 300 comprises the bi-directional DC-to-DC converter, the switch pairs n01 and n02 to latch to a cell or module, and the switch pairs n03 and n04 to remove or include a cell in the series. The circuit 300 also includes a reconfigurable short-term energy storage device. This short-term energy storage device is shown as, but is not limited to, a capacitor C1. In this embodiment, a pair of switches n05 and n06 is included for each cell along with the energy storage device, capacitor C1. The pair of switches n05/n06 enables energy to be moved between the capacitor C1 and any of the cells. This circuit 300 can work with multiple non-concurrent cells within the system. For example to put energy into the short term energy storage device C1, use the system to move energy into or out of cells/modules 1 and 2 as well as to move energy into or out of cell 4 using the short term energy storage device C1.

Figure 4:
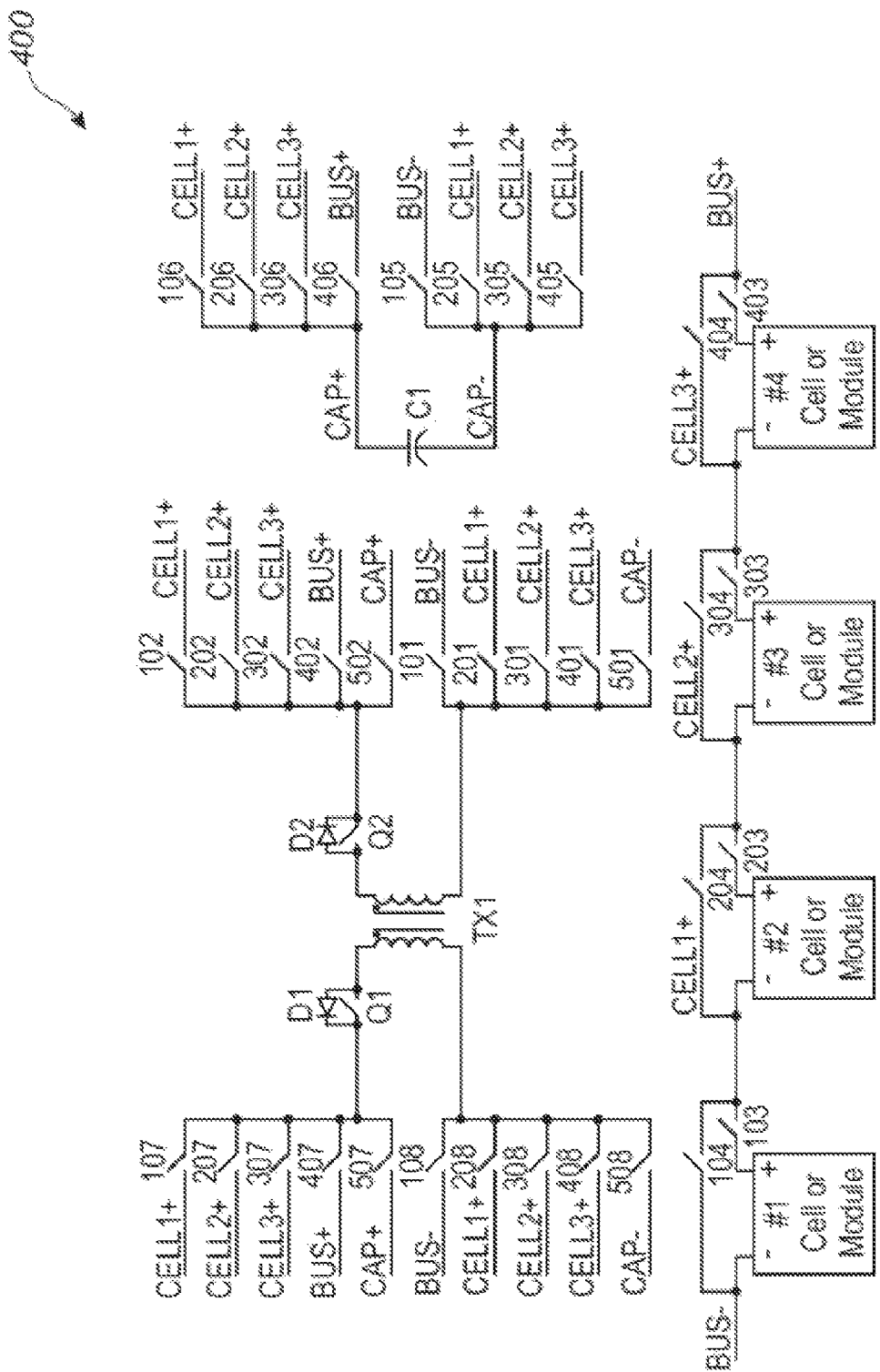
FIG. 4 is a schematic illustrating a different embodiment of a cell management system using four battery cells.

FIG. 4 is a schematic illustrating another embodiment 400 of a cell management system capable of distributing either a sink or source current through the bus or a multiplicity of cells within the bus. The same reference numerals are used for corresponding components illustrated in FIG. 3. The circuit 400 comprises the bi-directional DC-to-DC converter, the switch pairs n01 and n02 to latch to cell(s) or module(s), the switch pairs n03 and n04 to remove or include a cell in the series, the reconfigurable short-term energy storage device (illustrated by the capacitor C1), and the switch pairs n05 and n06 to enable energy movement between the energy storage device and the cells. The switch pairs n07 and n08 allow for the other side of the circuit to latch to any other set of cells/modules or the entire bus. This allows the system to move energy from one cell/module to another cell/module, multiple cells/modules to a single cell/module, multiple cells/modules to multiple cells/modules, while any one of those is occurring the system can also move energy from a single cell to another single cell, the bus to a single cell, a set of multiple cells to a single cell or any configuration available using the short-term energy storage device.

Figure 5:
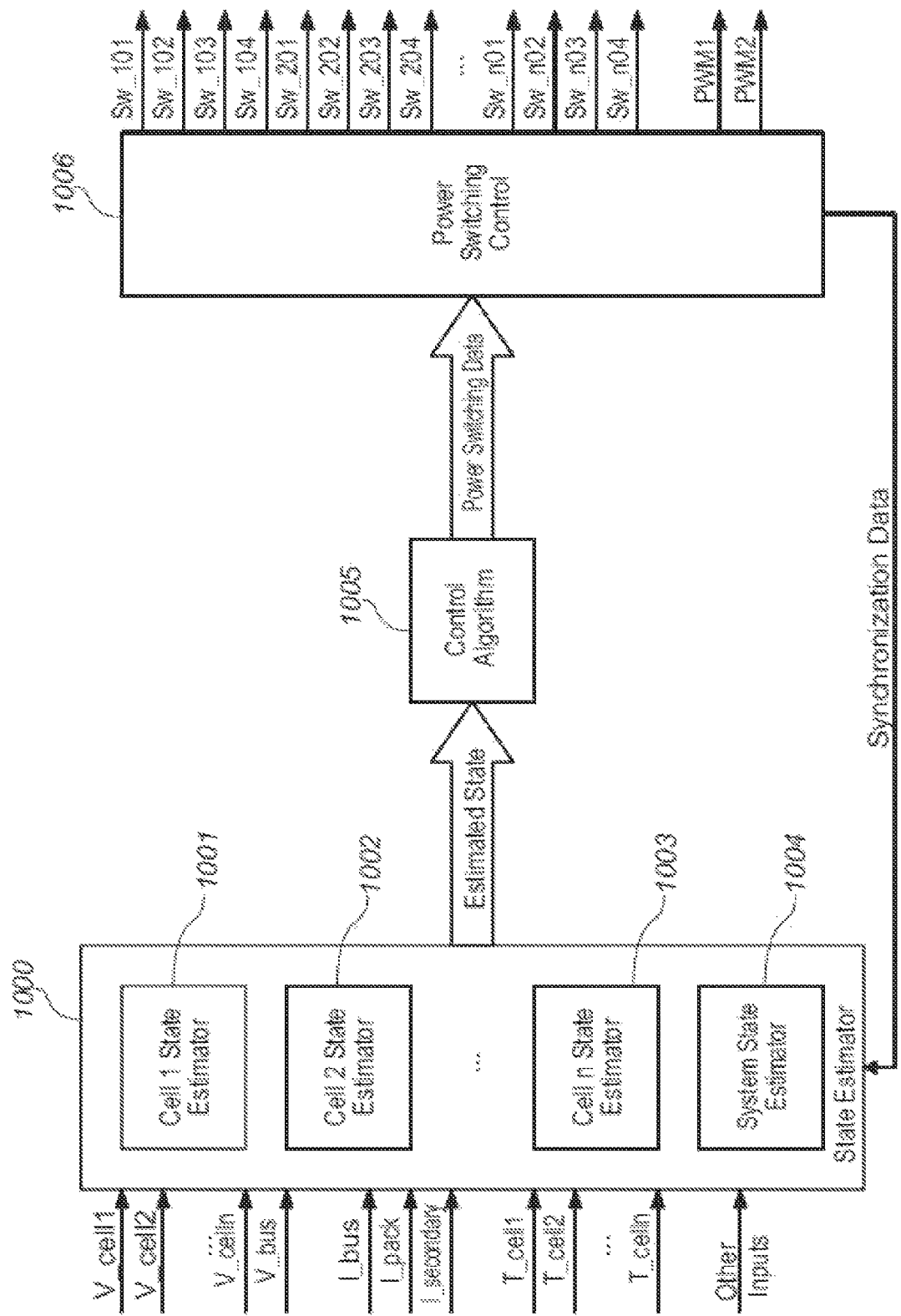
FIG. 5 is an exemplary overview of a cell management system control functionality.

FIG. 5 is an exemplary block diagram of control functionality which controls switch positions for the cell management system. The control functionality includes a state estimator block 1000, a control algorithm block 1005 and a switching control block 1006. The state estimator block 1000 has sensors that simultaneously monitor voltage, current, temperature, and any other desired inputs from each cell. Each cell, 1 through n, has its own cell state estimator represented as cell blocks 1001, 1002 and 1003. The state estimator block 1000 also includes a system block 1004 which includes sensors that simultaneously monitor bus current, and other system inputs. The control algorithm block 1005 uses the inputs from the state estimator block 1000 to determine positions for the switches of the cell management system. The determined switch positions from the control algorithm block 1005 are input to the switching control block 1006 which controls the actual switching of the switches in the cell management system. Synchronization data can also be sent from the switching control block 1006 to the state estimator block 1000. Individual cell or module switch controls labeled as Sw_101 to Sw_104 through Sw_n01 to Sw_n04 correspond to the switch numbering sequences for the individual cells/modules. PWM1 and PWM2 reference switches Q1 and Q2, respectively.

Figure 6:
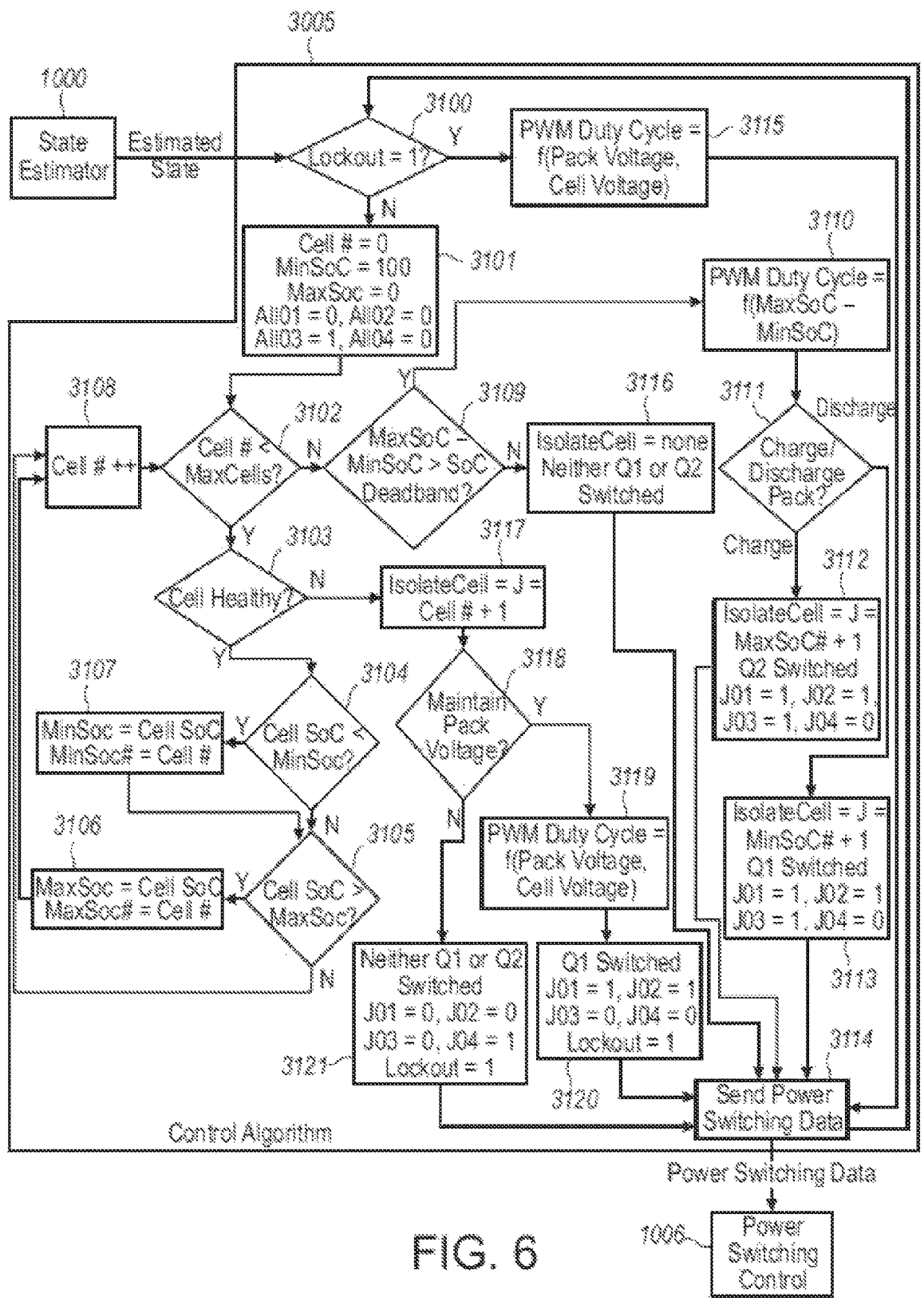
FIG. 6 is an exemplary control flow diagram for a non-synchronous control system.

FIG. 6 illustrates the functionality of an exemplary non-synchronous controller 3005 that can be used in the control algorithm block 1005 of FIG. 5. The state estimator block 1000 computes cell parameters which are passed to block 3100 of the controller 3005.

At block 3100, the controller 3005 checks if the system has determined to bypass or "lockout" an unhealthy cell of the series of cells. Note that the lockout parameter is initially set to "0" and that the lockout parameter within block 3100 is determined in blocks 3120 and 3121, explained below. As such, on the initial pass through block 3100, the lockout parameter will read "0" and control will pass to block 3101. If during a later pass, the lockout parameter is set to "1", control is passed to block 3115.

At block 3101, the controller 3005 resets the cell number to an initial value of zero (0) and resets the switch positions to "normal" series operation by closing all n03 group switches and opening all n01, n02, and n04 group switches. Block 3101 also resets the maximum and minimum SOC variables, and then passes control to block 3102.

At block 3102, the controller 3005 determines if the cell to be checked is within the total number of cells within the system. If the total number of cells has been exceeded, the readings are complete and the maximum and minimum SOC variables have been determined and control is passed to block 3109. Otherwise, control is passed to block 3103.

At block 3103, the controller 3005 reviews the health designation of the cell, which is passed from the state estimator 1000. The state estimator 1000 determines the SOC for the cell and block 3103 determines whether the cell is healthy or not. The present embodiment can manage around an unhealthy cell. A cell's SOC can be calculated by monitoring its voltage and current to compute an ampere hour (Ah) and watt hour (Wh) count. The cell's SOC can also be calculated by measuring its impedance and its kinetic charge. The state estimator for the cell can use these methods to determine the SOC of the cell but is not limited to use only the methods mentioned. An unhealthy cell can be found if, but not limited to, the cell's impedance shows a short or an open circuit. If the cell is flagged as unhealthy, control is passed to block 3117. Otherwise, if the cell is healthy, control is passed to block 3104.

At block 3104, the controller 3005 reviews the cell to determine whether or not its SOC is less than the minimum SOC. If the cell's SOC is not less than the minimum SOC, control is passed to block 3105. If the cell's SOC is less than the minimum SOC, control is passed to block 3107.

At block 3107, the controller 3005 stores the current cell number as the cell with the lowest SOC, records the cell's SOC as the minimum SOC, and passes control to block 3105.

At block 3105, the controller 3005 determines if the current cell's SOC is above the recorded maximum SOC. If the current cell's SOC is greater than the recorded maximum SOC, control is passed to block 3106. If the current cell's SOC is not greater than the recorded maximum SOC, control is passed to block 3108.

At block 3106, the controller 3005 stores the current cell number as the cell with the highest SOC, records this cell's SOC as the maximum SOC, and passes control to block 3108.

At block 3108, the controller 3005 increments the cell number by one and passes control back to block 3102.

At block 3109, the controller 3005 determines whether the difference between the maximum SOC and the minimum SOC for the cells is over or under the target SOC range. If the cells are determined to be within an acceptable difference or tolerance of each other the system does nothing. If, however the cells fall outside of that difference or tolerance range, the system will operate to bring them back within the desired range. If the difference between the maximum SOC and minimum SOC for the cells is not outside the established range, control is passed to block 3116. However, if the difference is outside the established range, control is passed to block 3110.

At block 3110, the controller 3005 calculates a Pulse Width Modulation (PWM) duty cycle as a function of the maximum SOC and the minimum SOC for the cells to determine the amount of time the switches need to be operating in their appropriate positions and, control is passed to block 3111. The duty cycle is computed to find the operating point of the switches Q1 and Q2 to minimize the time required to find the required set point to move energy.

At block 3111, the controller 3005 determines whether the pack or module is in charge or discharge mode. If the pack or module is in discharge mode, control is passed to block 3113. If the pack or module is in charge mode, control is passed to block 3112.

At block 3112, the controller 3005 sets the switch positions to 'latch on' to the cell with the maximum SOC, and prepares the system to discharge that cell. The system is prepared to discharge cell J by switching Q2, closing switches J01, J02 and J03 and opening switch J04. Control is then passed to block 3114.

At block 3113, the controller 3005 sets the switch positions to 'latch on' to the cell with the minimum SOC, and prepares the system to charge that cell. The system is prepared to charge cell J by switching Q1, closing switches J01, J02 and J03 and opening switch J04. Control is then passed to block 3114.

At block 3116, the controller 3005 sets the switch positions to take no action so that no energy is transferred to or from any cell within the system. Control is then passed to block 3114.

At block 3117, the controller 3005 assigns the unhealthy cell number to cell ID variable J and passes control to block 3118.

At block 3118, the controller 3005 reviews configuration parameters to see if the voltage is to be maintained or if the system is to operate without that cell's voltage. This is a user selectable input and can be included in a user-input table such as a calibration set. If the system is to operate without the unhealthy cell, control is passed to block 3121. If the system parameters call for voltage to be maintained, control is passed to block 3119.

At block 3119, the controller 3005 determines a PWM duty cycle required to maintain the voltage of the unhealthy cell. One way this can be computed is by an equation that compares the differing voltage and, based on which direction energy is to flow, sums the voltages and divides the sum by the source voltage. The output of the equation can be used as a starting point for the duty cycle. Control is then passed to block 3120.

At block 3120, the controller 3005 sets the system to 'latch on' to the unhealthy cell location and remove the unhealthy cell from the system. This allows the system to provide the voltage and power requirements for the unhealthy cell, and allows the unhealthy cell to be removed from the system and replaced. At block 3120, the controller 3005 also sets the lockout parameter to "1" to tell the system there is an unhealthy cell; it closes switches J01 and J02 to latch on to cell J. It also opens switches J03 and J04 to disconnect the unhealthy cell from the system and allow the system to add voltage at that point. Control is then passed to block 3114.

At block 3121, the controller 3005 sets the system parameters for no voltage maintenance and removes the unhealthy cell by bypassing it; opening switches J01, J02 and J03 and closing switch J04. At block 3121, the controller 3005 also sets the lockout parameter to "1" to tell the system there is an unhealthy cell and it needs to be dealt with. Control is then passed to block 3114.

At block 3114, the controller 3005 sends switching data to power switching control block 1006 shown in FIG. 5.

Control is passed to block 3115 from block 3100, if either of blocks 3120 or 3121 has flagged a cell as requiring a lockout. At block 3115, the controller 3005 recalculates the PWM duty cycle, which can be done using the equation described with regard to block 3119. Control is then passed to block 3114.

Figure 7:
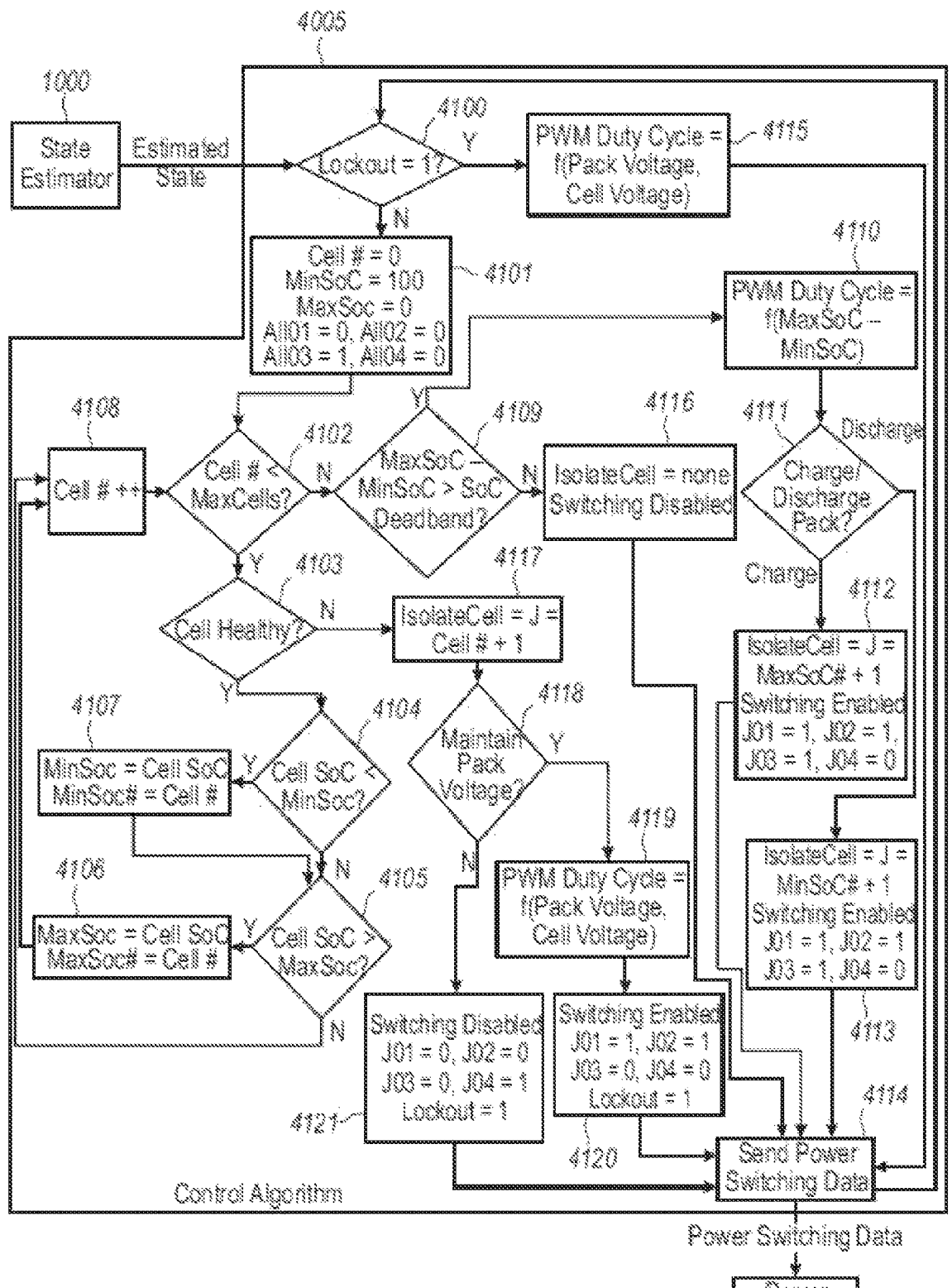
FIG. 7 is an exemplary control flow diagram for a synchronous control system.

FIG. 7 illustrates the functionality of an exemplary synchronous controller 4005 that can be used in an alternative embodiment of the control algorithm block 1005 of FIG. 5.

The primary difference between the control functionality of controller 3005 (FIG. 6) and controller 4005 (FIG. 7) is that controller 3005 uses both switches (Q1 and Q2) while controller 4005 only uses one switch (Q1 or Q2). The differences can be found in the following blocks: 3112/4112, 3113/4113, 3120/4120 and 3121/4121. The functionality of the remaining blocks in FIG. 7 is the same as the corresponding blocks in FIG. 6. In blocks 4112, 4113, 4120 and 4121 of FIG. 7, instead of calling out a particular switch (Q1 or Q2) to be switched; switching is enabled or disabled according to switch tables shown in FIGS. 10 and 11. In FIG. 7, switching enabled means the position of the switch being used (Q1 or Q2) is changed, and switching disabled means the position of the switch being used is not changed.

Note that the embodiments described above do not show operations while the pack sits idle. Further embodiments of the system can operate while the pack is charging, discharging or sitting in an idle state. The controller for these embodiments can be found in FIGS. 8 and 9, but are not limited to these embodiments. These controllers represent different embodiments of control algorithm block 1005 shown in FIG. 5.

Figure 8:
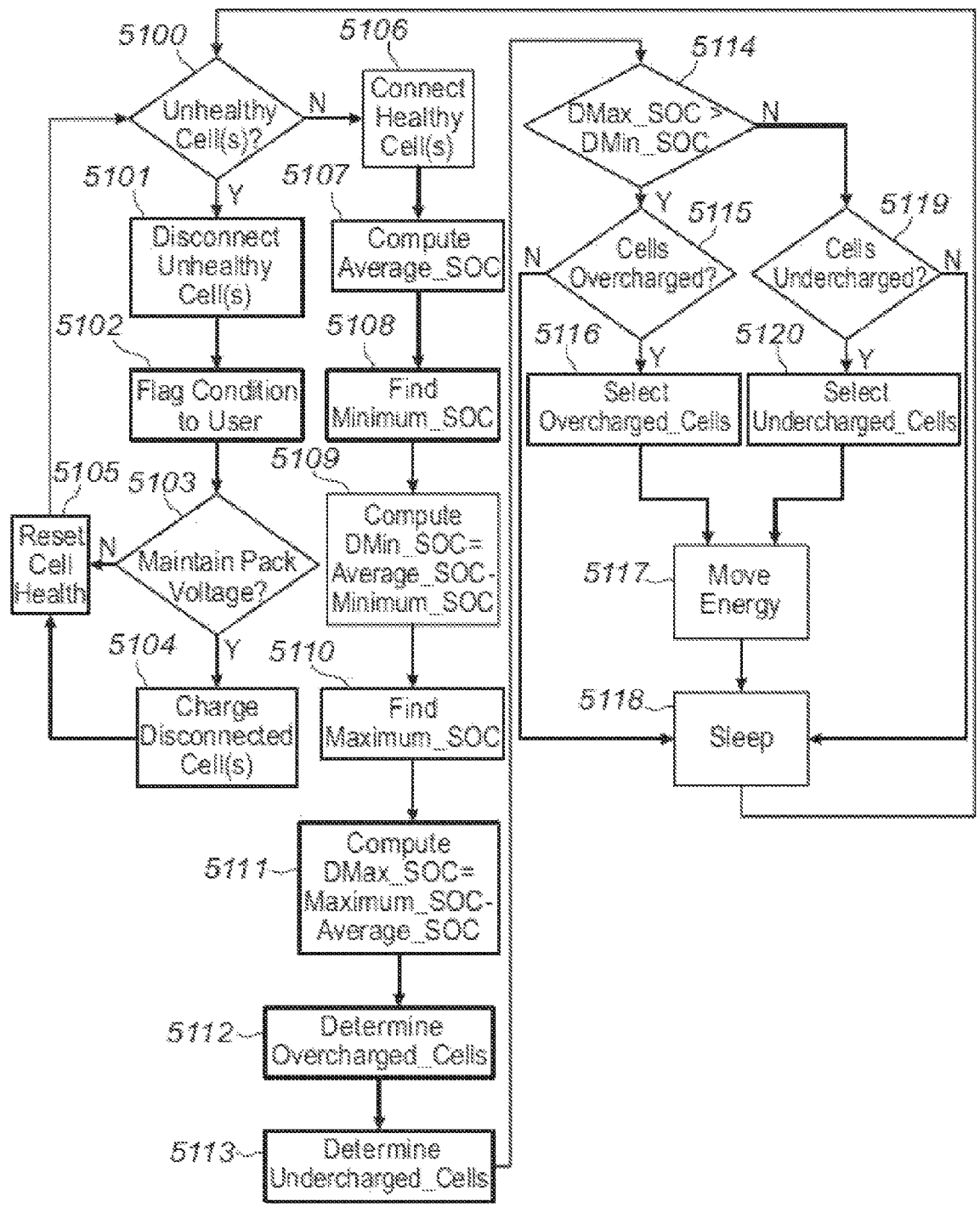
FIG. 8 is an exemplary control flow diagram for a multiple cell control system.

FIG. 8 illustrates an exemplary embodiment of a multiple cell control system for control algorithm block 1005 of FIG. 5.

At block 5100, the controller checks if the system has determined to bypass or "lockout" any unhealthy cell(s). If unhealthy cell(s) have been detected, control is passed to block 5101; otherwise control is passed to block 5106.

At block 5101, the controller disconnects the unhealthy cell(s) and control is passed to block 5102. At block 5102, the controller notifies the user of the unhealthy cell condition and control is passed to block 5103. At block 5103, the controller checks if the user has elected to maintain pack voltage. This election can be made using a user-selectable parameter. If the user has elected to maintain pack voltage, control is passed to block 5104; otherwise control is passed to block 5105. At block 5104, the controller charges the disconnected cells and then passes control to block 5105. At block 5105, the cell health parameters are reset and control is passed back to block 5100.

At block 5106, the controller connects the healthy cell(s) and control is passed to block 5107. At block 5107, the controller computes the average SOC of the healthy cells and control is passed to block 5108. At block 5108, the controller finds the cell with the minimum SOC and the value of the minimum SOC and control is passed to block 5109. At block 5109, the controller computes the difference between the average SOC and the minimum SOC and control is passed to block 5110. At block 5110, the controller finds the cell with the maximum SOC and the value of the maximum SOC and control is passed to block 5111. At block 5111, the controller computes the difference between the maximum SOC and the average SOC and control is passed to block 5112. At block 5112, the controller determines any overcharged cells by looking at their voltage and SOC and control is passed to block 5113. At block 5113, the controller determines any undercharged cells and control is passed to block 5114.

At block 5114, the controller determines whether the difference between the maximum and average SOC is greater than the difference between the average and minimum SOC. If the difference between the maximum and average SOC is greater than the difference between the average and minimum SOC, control is passed to block 5115; otherwise control is passed to block 5119.

At block 5115, the controller checks if any cells are overcharged. If there are no overcharged cells, control is passed to block 5118; otherwise control is passed to block 5116. At block 5116, the controller selects the overcharged cells and control is passed to block 5117. At block 5117, the controller sets the power switches, moves energy from the overcharged cells, and then passes control to block 5118.

At block 5119, the controller checks if any cells are undercharged. If there are no undercharged cells, control is passed to block 5118; otherwise control is passed to block 5120. At block 5120, the controller selects the undercharged cells and control is passed to block 5117. At block 5117, the controller sets the power switches, moves energy to the undercharged cells, and then passes control to block 5118.

At block 5118 the controller enters a sleep state. The sleep state can be for a user-selectable period of time, or until a condition is detected that triggers the controller to resume operation, or both. When the controller exits the sleep state, control is passed back to block 5100.

Figure 9:
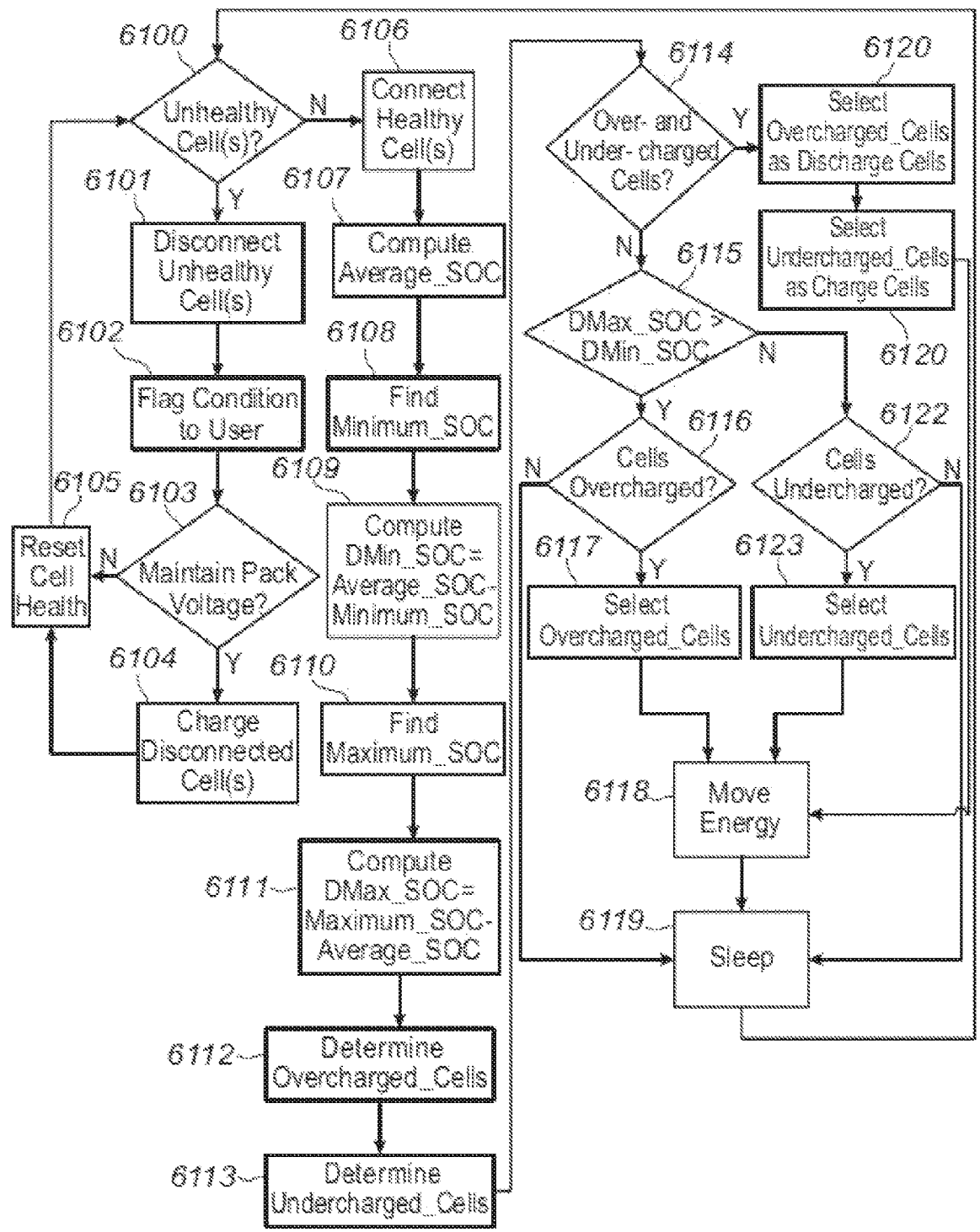
FIG. 9 is an exemplary control flow diagram for a multiple cell to single or multiple cell control system.

FIG. 9 shows an alternative embodiment of control block 1005 that can deal with both overcharged and undercharged cells simultaneously. The primary difference between the control systems of FIGS. 8 and 9, are the additional blocks 6121, 6122 and 6123 of FIG. 9. The functionality of the remaining blocks in FIG. 9 is the same as the corresponding blocks in FIG. 8. At block 6121, the controller checks if there are both undercharged and overcharged cells. If there are not both undercharged and overcharged cells, control is passed to block 6114 which corresponds to block 5114 of FIG. 8. However if there are both undercharged and overcharged cells, control is passed to block 6122 where the overcharged cells are selected as discharge cells; and then to block 6123 where the undercharged cells are selected as charge cells, and then to block 6117 where energy is moved from the overcharged discharge cells to the undercharged charge cells. Block 6117 corresponds to block 5117 of FIG. 8

Embodiments of the system can work with two or more unhealthy cells or modules within the system as well as determine multiple cells that fall outside of the dead-band operational SOC. These embodiments are able to latch on multiple non-concurrent cell/module locations to achieve this goal. Schematics for exemplary embodiments of these implementations are shown in FIGS. 3 and 4.

Embodiments of the system allow latching on up to n–1 cells or modules within a system comprised of n cells or modules in a contiguous manner. An example of this would be to latch to two cells, such as by using switches 101 and 202 as seen in FIG. 2 to latch to cells/modules 1 and 2. A schematic for an exemplary embodiment of this implementation is shown in FIG. 2.

Embodiments of the system can 'latch on' to multiple cells or modules in a non-contiguous manner. These embodiments use a reconfigurable short-term energy storage device to latch to cell(s)/module(s) that the system is not latched to. This allows the device to work with multiple non-contiguous cells/modules. A schematic for an exemplary embodiment of this implementation is shown in FIG. 3.

Embodiments of the system allow a single or multiple contiguous cells or modules to pass energy directly to a differing set of contiguous cells or modules within the same system. These embodiments can latch to different parts of the system on either side of the DC-to-DC converter and are not limited to one side only being able to latch to the bus. A schematic for an exemplary embodiment of this implementation is shown in FIG. 4.

FIG. 10 describes the operation of switches Q1 and Q2 to move energy between the bus and one or more cells/modules for the embodiment shown in FIG. 2 for a synchronous converter that uses both switches Q1 and Q2. The timing of the switches is partly a function of energy desired. In sequence 1 of FIG. 10, energy is moved from the bus (source) to a cell/module or set of cells/modules (destination). In sequence 2 of FIG. 10, energy is moved from a cell/module or set of cells/modules (source) to the bus (destination). In either case, the system works by first charging the transformer TX1 (or an inductor L1) from the energy source in step 1, and then releasing that energy into the desired destination in steps 2-4.

For a protected circuit with diodes D1 and D2 parallel to switches Q1 and Q2 as shown in FIG. 2, the following energy flow can be achieved. When switch Q1 is closed, energy can flow through the switch Q1 between the bus and the transformer TX1. When switch Q1 is open, energy can flow from the transformer TX1 to the bus through the diode D1. When switch Q2 is closed, energy can flow through the switch Q2 between a selected cell(s)/module(s) (using switches n01, n02 for the selected cell(s)/module(s)) and the transformer TX1. When switch Q2 is open, energy can flow from the transformer TX1 to the selected cell/module through the diode D2.

FIG. 11 describes the operation of switches Q1 and Q2 to move energy between the bus and one or more cells/modules for the embodiment shown in FIG. 2 for a non-synchronous converter that uses only switch Q1 or Q2 depending on which direction energy is flowing. The timing of the switches is partly a function of energy desired. In sequence 1 of FIG. 11, energy is moved from the bus (source) to a cell/module or set of cells/modules (destination) using switch Q1. In sequence 2 of FIG. 11, energy is moved from a cell/module or set of cells/modules (source) to the bus (destination) using switch Q2. In either sequence, the system works by first charging the transformer TX1 (or inductor L1) from the energy source in step 1, and then releasing that energy into the desired location in step 2.

FIG. 12 describes the positions of switches n01, n02, n03 and n04 for latching to a single cell/module in a four cell embodiment such as the one shown in FIG. 2. This also describes how to latch to each of the four cells/modules within the circuit.

FIG. 13 describes the positions of switches n01, n02, n03 and n04 to latch to two consecutive cells/modules in a four cell embodiment such as the one shown in FIG. 2. This also describes how to latch to all sets of two consecutive cells within the circuit.

FIG. 14 describes the positions of switches n01, n02, n03 and n04 to latch to three consecutive cells/modules in a four cell embodiment such as the one shown in FIG. 2. This also describes how to latch to all of the three consecutive cell combinations within the circuit.

FIG. 15 describes the positions of switches n01, n02, n03 and n04 to latch to all four cells/modules in a four cell embodiment such as the one shown in FIG. 2. This is only showing the capability of the circuit, as it may be inefficient to enable the circuit in this manner.

FIG. 16 describes the positions of switches n01, n02, n03 and n04 to isolate and remove an individual cell/module in a four cell embodiment such as the one shown in FIG. 2. Note that the cell/module is still able to have its voltage measured to determine if the cell/module is healthy or unhealthy. If a cell/module is determined to be healthy again after being isolated and removed, it can be switched back into the circuit to be used again.

It should be appreciated that the exemplary switch positions shown in FIGS. 12-16 for a four cell/module embodiment can readily be expanded to more or less than four cell/module embodiments by one of ordinary skill in the art.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A cell management system for balancing energy across a plurality of cells coupled to a circuit bus, each cell of the plurality of cells including a positive terminal and a negative terminal, the cell management system comprising:
for each cell of the plurality of cells, a first cell switch pair, a second cell switch pair, and a fourth cell switch pair;
a transformer comprising a first inductor and a second inductor, the first inductor being on a first side of the transformer and the second inductor being on a second side of the transformer; the first cell switch pair for each cell of the plurality of cells being on the second side of the transformer, and the fourth cell switch pair for each cell of the plurality of cells being on the first side of the transformer;
a first transformer switch between the first inductor and the fourth cell switch pair for each cell of the plurality of cells;
a second transformer switch between the second inductor and the first cell switch pair for each cell of the plurality of cells;
a connection between the circuit bus and a first cell in the serial connection of the plurality of cells, the first cell being one of the plurality of cells and being located at a first end of the serial connection of the plurality of cells; and
a connection between the circuit bus and a last cell in the serial connection of the plurality of cells, the last cell being one of the plurality of cells and being located at a second end of the serial connection of the plurality of cells, the second end being opposite of the first end;
wherein for each individual cell of the plurality of cells, the first cell switch pair of the individual cell allows the transfer of energy between the transformer and the individual cell, the second cell switch pair of the individual cell allows the removal or inclusion of the individual cell in the serial connection of the plurality of cells, and the fourth cell switch pair of the individual cell allows the transfer of energy between the transformer and the individual cell.

2. The cell management system of claim 1,
wherein the first cell switch pair for an individual cell of the plurality of cells comprises a first cell switch coupling the negative terminal of the individual cell with the second inductor, and a second cell switch coupling the positive terminal of the individual cell with the second transformer switch, the second inductor being between the first cell switch and the second transformer switch, and the second transformer switch being between the second inductor and the second cell switch; and
wherein the fourth cell switch pair for an individual cell of the plurality of cells comprises an eighth cell switch coupling the negative terminal of the individual cell with the first inductor, and a seventh cell switch coupling the positive terminal of the individual cell with the first transformer switch, the first inductor being between the eighth cell switch and the first transformer switch, and the first transformer switch being between the first inductor and the seventh cell switch.

3. The cell management system of claim 2, further comprising:
a plurality of cell sensors, each of the plurality of cell sensors monitoring at least one of a cell voltage, a cell temperature and a cell current for the plurality of cells;
a bus sensor monitoring a parameter of the circuit bus;
a cell state estimator determining a state of each of the plurality of cells using the cell sensors;
a system state estimator determining a state of the circuit bus; and
a controller controlling the first transformer switch, the second transformer switch, the first cell switch pair, the second cell switch pair and the fourth cell switch pair based on the state of each of the plurality of cells and the state of the circuit bus.

4. The cell management system of claim 2, further comprising:

a short-term energy storage device, a storage device switch pair allowing the transfer of energy between the transformer and the short-term energy storage device; and for each individual cell of the plurality of cells, a third cell switch pair allowing the transfer of energy between the short-term energy storage device and the individual cell.

5. The cell management system of claim 4, further comprising:

a plurality of cell sensors, each of the plurality of cell sensors monitoring at least one of a cell voltage, a cell temperature and a cell current for the plurality of cells;

a bus sensor monitoring a parameter of the circuit bus;

a storage device sensor monitoring a parameter of the short-term energy storage device;

a cell state estimator determining a state of each of the plurality of cells using the cell sensors;

a system state estimator determining a state of the circuit bus; and a storage device state estimator determining a state of the short-term energy storage device; and a controller controlling the first transformer switch, the second transformer switch, the first cell switch pair, the second cell switch pair, the third cell switch pair, the fourth cell switch pair, and the storage device switch pair based on the state of each of the plurality of cells, the state of the circuit bus, and the state of the short-term energy storage device.

* * * * *